Patented Mar. 8, 1927.

1,620,333

UNITED STATES PATENT OFFICE.

WILSON EVANS, OF CHICAGO, ILLINOIS, ASSIGNOR TO ALUMINATE SALES CORPORATION, OF CHICAGO, ILLINOIS, A CORPORATION OF ILLINOIS.

PROCESS OF TREATING LIQUIDS.

No Drawing. Application filed May 29, 1925. Serial No. 33,655.

My invention relates to improvements in processes of treating water and is primarily adapted for the cold treatment of water in softening plants adapted to prepare it for commercial purposes such as use in boilers, laundries, fruit canning plants, dye-houses, chemical processes, or for domestic uses. I propose to use in connection with any ordinary water softening or treating mixture, a reagent which will expedite and cause to progress nearer to completion the process carried on by the softening or treating mixture and to some extent by the additional reagent itself, and which coagulate or flocculate the resultant precipitate so as to carry down and settle out such precipitate and any other matter which may be in suspension, thus rendering settling or filtration easier and more rapid and positive. I propose to mix this additional reagent or catalyst with the water after the introduction of the other reating elements which are used in connection with it and of course in this case it becomes necessary to provide separate means for introducing the various reagents at different times.

The reagent or catalyst which I propose to use is sodium aluminate which is for example present in the liquid obtained by digesting either the raw mineral bauxite or aluminum hydroxide (commercially referred to as bauxite ore concentrates) with suitable portions of soda ash and lime or with caustic soda, and, in case the raw bauxite is used or the digestion accomplished with lime and soda ash, if desired, filtering, and under some circumstances, concentrating the filtrate to any desired and feasible point. The active ingredient in the resulting liquid in the process I propose, is in any case its sodium aluminate content, and for convenience this liquid will hereafter be referred to as sodium aluminate solution. It should be particularly noted, however, that an excess of caustic soda in the sodium aluminate solution, either added as such or deried from lime and soda ash in digesting, is desirable in order to prevent the raid precipitation of aluminum hydrate from the liquid. Other ingredients present in the sodium aluminate solution, such as organic matter and soda ash, are there only due to process of manufacture followed. The viscosity of the sodium aluminate solution increases as its contents of sodium aluminate and caustic soda is increased and it has been found desirable to limit the content of sodium aluminate in the commercial solution to about thirty-five percent with about five percent excess caustic soda, although it is possible to produce in exactly the same manner by simply reducing the amount of water used in the digesting process, or by evaporation of the resultant liquid, a sodium aluminate solution containing a considerably greater percentage of sodium aluminate, but such a solution, particularly when cold, becomes so viscous as to make its handling difficult for commercial use.

For purposes of illustration, the following is a statement of a satisfactory batch of my material;

205 lbs 50% commercial caustic soda solution, gravity approx. 1.53; 140 lbs. commercial bauxite ore concentrates, 64% alumina ($Al_2O_3$); 76 lbs water; total 421 lbs. sodium aluminate solution, gravity approx. 1.52, containing 34.30% sodium aluminate and 7.6% excess caustic soda.

My process is preferably carried on in connection with water softening or treating by the lime, soda ash process. The purpose of such treatment independent of my invention is to remove from the water the dissolved calcium and magnesium salts present largely in the form of bi-carbonates, carbonates and sulphates. The lime is used to convert the soluble calcium bi-carbonate into the corresponding insoluble carbonate and also to convert the soluble magnesium bicarbonate into the corresponding partially soluble magnesium carbonate which latter is reacted upon by a further amount of lime to form the insoluble magnesium hydroxide, such action being expedited and carried further toward completion by my treatment. The soda ash converts the calcium sulphate into the corresponding insoluble carbonate and converts the magnesium sulphate into the partially soluble magnesium carbonate which is in turn, acted upon my the lime used in the treatment and converted into the insoluble magnesium hydroxide, such action being expedited and carried further toward completion by my treatment. Experience shows that, particularly when water is treated cold with lime and soda ash only, the reactions above indicated, especially so far as the formation of the insoluble magnesium hydroxide is concerned, progresses very slowly and only to a partial extent, and in order to secure reasonably complete elimination of the dissolved calcium and magnesium salts it is necessary to employ a considerable excess amount of soda ash and lime. As an illustration of this action the following test made on a sample of hard water may be cited.

The untreated water showed hardness by the conventional soap test to be 16.5 grains per gallon on the basis of calcium carbonate with a total alkalinity determined by methyl orange titration of 13.3 grains per gallon also expressed as calcium carbonate.

The following tabulation shows tests on this water treated with proper amounts of lime and soda ash, the figures showing results of the tests being expressed under the headings H, A and C, H referring to hardness by soap tests, A referring to alkalinity by methyl orange titration, and C referring to twice the phenolpthalein titration, the term C being used to represent "causticity" as this is popularly although incorrectly referred to as such. Tests referred to are as follows:

| Time after treatment. | H. | A. | C. |
|---|---|---|---|
| 20 minutes | 7.9 | 9.4 | 10.8 |
| 1 hour, 30 minutes | 7.4 | 9.0 | 10.7 |
| 2 hours, 30 minutes | 6.7 | 8.7 | 10.4 |

In the above test the excess reagents are indicated by the difference between the H and A values, and the difference between the A and C values represents that portion of the excess which is present as caustic soda or if the difference between A and C is greater than between H and A then the total excess is the difference between A and C, of which the A—H difference represents caustic soda and the remainder free lime existing in the form of calcium hydrate. Not only do the reactions as outlined in cold water progress slowly and incompletely but the precipitates formed when lime and soda ash only are used for treatment are very fine and settle slowly and when filtration is used, water so treated filters with difficulty, resulting sometimes in cloudy effluent especially at high rates of filtration. Moreover, even when the visible precipitates have been settled or filtered and the water is crystal clear, there is an after-reaction which results in the very gradual though long continued formation of precipitates, which are deposited on the grains of sand or silica used as a filtering medium, or on the pipes through which the water flows, causing the individual grains to grow, or the pipes to be gradually clogged. If the crystal clear water which has been treated by the lime, soda ash process is introduced into a boiler or otherwise heated, the after-reaction is greatly speeded up with the formation of further precipitates in relatively large quantities, causing foaming and scale formation, and this difficulty is increased, if in the effort to insure complete reaction an increased amount of the softening reagents has been used.

It is to avoid the difficulties above referred to that I have developed my process. The manner in which this is accomplished may be well illustrated by quoting results of parallel tests made on the same water referred to above. In this case there was used for its treatment lime, soda ash, and sodium aluminate solution in proper quantities, the tests on the treated water being as follows:

| Time after treatment. | H. | A. | C. |
|---|---|---|---|
| 20 minutes | 4.3 | 4.7 | 5.0 |
| 1 hour, 30 minutes | 3.3 | 4.4 | 4.2 |
| 2 hours, 30 minutes | 3.4 | 4.2 | 4.4 |

It will be noted from these tests that the excess reagents as indicated by the differences above outlined have been to a large extent eliminated. Many other tests have been made showing complete elimination of excess reagents with water carried down to a lower point in hardness but these particular tests are quoted as they were made using a quantity of sodium aluminate solution considered feasible for commercial use, and were being at the time duplicated in a softening plant treating 600,000 gallons of water for 24 hours. In the case of all tests the results of which are quoted above both when using the lime and soda ash alone and when using lime, soda ash and sodium aluminate solution, the water was initially treated at a temperature of 46° F. and did not exceed that temperature until tests as above quoted were made.

Experience shows that at temperatures as low as 34° F. equally as good results can be obtained with the sodium aluminate solution, while the results obtained without it become increasingly worse as the temperature falls. Due to the lower hardness obtained and the smaller excess of reagents in the treated water, this water was rendered much more suitable for the purposes for which it was treated. The after-reaction above referred to is done away with to the extent that excess treatment is eliminated, and further the precipitates are much larger and are coagulated so as to settle rapidly and also carry down with them at a rapid rate any foreign matter which may be suspended in the water.

My process is carried out by introducing into the water which has previously been mixed or treated with lime and soda ash or with either alone a suitable quantity of sodium aluminate solution. When this is done rapid precipitation and coagulation takes place and the precipitate settles down in a flocculent form carrying with it as above indicated the organic or other matter which may be in suspension in the water. The water and the precipitates are then separated in any suitable way as by drawing off the clear, super-natant water, and if desired, by filtering, although this is not ordinarily necessary with my process on account of the greatly improved settling secured by it. The resultant clarified, purified, softened water will then be fed directly into the boiler and can be heated without bringing down any appreciable amount of further precipitate, or it may be used in the manufacture of artificial ice where, owing to the absence of the salts otherwise present, better, less brittle and clearer ice is formed, or this water may be satisfactorily used for the other purposes for which it is intended including domestic uses.

With reference to the claims it must be emphasized that by the use of the term sodium aluminate I do not wish to be limited to chemically pure sodium aluminate, as, while chemically pre sodium aluminate might be used, still a sodium aluminate solution containing, as previously indicated, sodium hydroxide, sodium carbonate and organic matter, or other foreign matter, or any or all of them in the presence of sodium aluminate will operate satisfactorily.

The sodium aluminate has what may be termed a catalytic effect; at least it is an effect somewhat analogous to a catalytic effect because it speeds up or reinforces and makes more positive the softening action of the lime soda ash softening compounds, or of any other softening compounds used in the water. It may be used in such quantities as not at all to be sufficient by itself for water softening. It may be used in such quantities that the total quantity of it with other compounds would, if the activity of the sodium aluminate were only that normally to be expected, be quite inadequate for satisfactory water softening; but when combined with the other water softening compounds it has an expediting or speeding up effect, reinforcing and furthering the action of the ordinary water treating compounds and resulting in an increased precipitation and coagulation.

When water containing calcium and magnesium salts or water containing either a calcium or a magnesium salt is treated with sodium aluminate and any standard water treating compound, either calcium or magnesium aluminates or both are formed. Either of these substances are very effective as a coagulant and their presence in the water results in the quick flocculation of the precipitates brought down by the water softening compound. The formation of the calcium and magnesium aluminates is illustrated by the following formulæ:

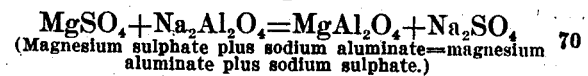
(Magnesium sulphate plus sodium aluminate=magnesium aluminate plus sodium sulphate.)

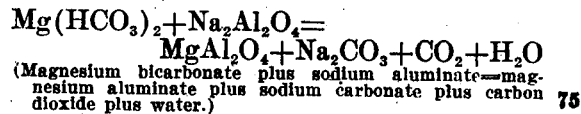
(Magnesium bicarbonate plus sodium aluminate=magnesium aluminate plus sodium carbonate plus carbon dioxide plus water.)

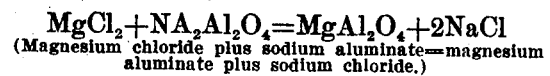
(Magnesium chloride plus sodium aluminate=magnesium aluminate plus sodium chloride.)

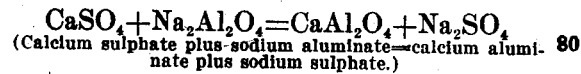
(Calcium sulphate plus sodium aluminate=calcium aluminate plus sodium sulphate.)

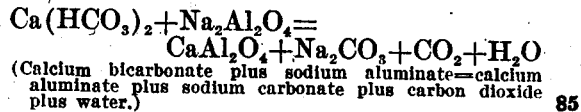
(Calcium bicarbonate plus sodium aluminate=calcium aluminate plus sodium carbonate plus carbon dioxide plus water.)

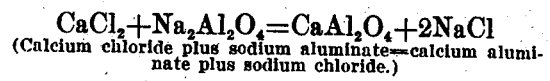
(Calcium chloride plus sodium aluminate=calcium aluminate plus sodium chloride.)

The coagulants, that is to say calcium or magnesium aluminates, formed by the use of sodium aluminate differ widely not only in their composition but also in their effect from those coagulants formed by the use of other aluminum compounds for example aluminum sulphate or alum. When aluminum sulphate is used, aluminum hydrate is formed, and this coagulent from a practical point of view is unsatisfactory not only because of its lack of effectiveness as compared with the calcium and magnesium aluminates but also because it is water soluble except within a comparatively narrow range of hydrogen ion concentrations, which range is normally outside of the range in which most commercial water softening takes place whereas calcium and magnesium aluminates are insoluble thru a wide range of hydrogen ion concentrations including the range in which most commercial water softening takes place. This is particularly true of magnesium aluminate and where magnesium is present in the water being treated this compound is instantly formed due to the fundamental law of chemical reaction to the effect that in a mixture of compounds which may react one upon another the most insoluble compound will be formed. Therefore by the use of sodium aluminate in connection with any magnesium carrying water, there is obtained a coagulant effective through an extremely wide range of hydrogen ion concentration the presence of which results in quick settling of the precipitants brought down by the water softening compound and due to breaking down the semi-colloidal and complex compounds contained in the water. The reaction with the water softening compound is carried to completion rapidly so that there is no after-reaction progressing in the treated water, which after-reaction would otherwise continue for a considerable period of time resulting in the incrustation of pipe lines through which the water is transmitted or vessels in which it is stored.

For some purposes and with some waters, for example water for ice making or for municipal water supply, it is not necessary or desirable to use soda ash. Soda ash is frequently not used where it is unnecessary to obtain the lowest possible hardness of the treated water and the expense of treating with soda ash is considered unjustified. Further some waters already contain an amount of sodium bicarbonate and with these waters the addition of soda ash (sodium carbonate) is manifestly unnecessary. In such cases, the use of lime and sodium aluminate alone, although not ordinarily producing a water of as low hardness as where lime soda ash and sodium aluminate are used, still produces a satisfactory result in that the sodium aluminate insures the practical completion of the lime reactions. If lime alone or, as in some cases, lime and aluminum sulphate or alum is used, the reactions do not progress as rapidly or as near to absolute completion as with the lime and sodium aluminate nor is such rapid settling obtained, and the difficulties resulting from after-reaction are present.

I claim:

1. The process of treating liquids which consists in mixing in solution lime, soda ash, mixing the resultant product with the liquid to be treated, and then adding sodium aluminate and separating the resultant precipitates from the liquid.

2. The process of treating liquids which consists in mixing in an aqueous solution lime and soda ash, then mixing the resultant product with the liquid to be treated, and then adding sodium aluminate and separating the resultant precipitates from the liquid.

3. The process of softening water which consists in adding thereto a softening compound adapted to react on the water to precipitate out insoluble salts and then adding to the water thus treated sodium aluminate and separating the water and the precipitates thus formed.

4. The process of treating liquids which consists in mixing lime with the liquid and then separately adding sodium aluminate thereto and separating the resultant precipitates from the liquid.

5. The process of treating liquids which consists in mixing with the liquid an aqueous solution of lime, then adding sodium aluminate to the treated liquid and separating the resultant precipitates from the liquid.

6. The process of treating liquids which consists in making up a mixture of lime and soda ash, adding the mixture to the liquid to be treated, then separately adding sodium aluminate and separating the resultant precipitates from the liquid.

7. The process of softening water which consists in adding thereto lime and soda ash and then separately adding thereto sodium aluminate in such proportions and quantities that the amount of sodium aluminate is insufficient to effect any adequate softening by itself but is sufficient to expedite and insure adequate softening by the other ingredients.

Signed at Chicago, county of Cook and State of Illinois, this 8th day of May, 1925.

WILSON EVANS.